Figure 1:
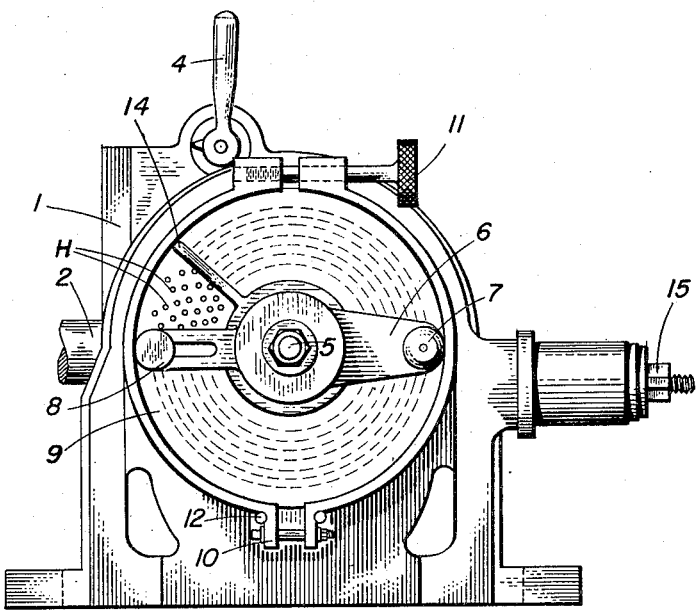

Inventor
James R. Thompson

Inventor
James R. Thompson

United States Patent Office

2,777,338
Patented Jan. 15, 1957

---

2,777,338

ATTACHMENT FOR INDEXING HEADS

James R. Thompson, Youngstown, Ohio

Application April 1, 1950, Serial No. 153,420

2 Claims. (Cl. 74—813)

The present invention relates to indexing apparatus and is particularly directed to an attachment for application to a standard universal indexing or dividing head such as is used for effecting angular rotation or adjustment of a spindle carrying work to be operated upon by a machine tool or generally comparable mechanism.

These heads, which are well known in the art, are designed to afford accurate spacing of the work about its axis to enable a cutting tool to perform its function with the requisite precision in successively cutting circumferentially spaced teeth, grooves or the like in the work. They are customarily supplied with circular plates adapted to be interchangeably mounted adjacent the head housing and each provided with several series of holes arranged in concentric circular rows about the center of the plate, each row having a number of holes different from the number in any other row in any of the same set of plates whereby through proper selection of the plate and the row of holes thereon any of a considerable range of indexing numbers may be availed of, each such number corresponding to the number of positions the work will occupy in a complete revolution about its axis.

The standard plates usually each have seven rows of holes and one set of six such plates thus provides a total of forty-two rows of holes, the number of holes per row varying from 51 to 100 inclusive. Such plates when used with a standard indexing head to index work mounted on its main spindle provide divisions or positions corresponding to all numbers in sequence from 2 to 100 and all numbers divisible by 5 up to 500 except those divisible by 25 seven to nineteen times inclusive other than 250 and 300, the latter multiples of 25 within this range being available; multiples of 2 between 100 and 200 other than those also divisible by 5 are not available however, nor are 200, 400, numbers divisible by 4 between 200 and 400 and those divisible by 8 between 400 and 500 unless likewise divisible by 5.

However with the aid of the attachment of my invention and by means of the same plates many of those numbers which have been designated as unattainable with the standard indexing head may be indexed, namely ninety-two additional ones in the range between 100 and 500, and many numbers higher than 500.

It is therefore a principal object of the invention to provide an attachment for a standard indexing head whereby with the aid of the indexing plates normally supplied with or obtained for the head additional numbers which cannot be indexed therewith in the customary way likewise may be indexed and the versatility of the machine as a whole thereby appreciably enhanced.

A further object is the provision of a removable attachment for an indexing head of standard design adapted to increase its indexing capacity without requiring the procurement of additional indexing plates having series of holes different from those normally provided for it.

A still further object is to provide an attachment for the purposes aforesaid which is simple in construction and relatively inexpensive, which can be quickly removed from or replaced upon the head as required and which by simple constructional changes may be adapted for use with commercial indexing heads of variant design.

Figure 2:
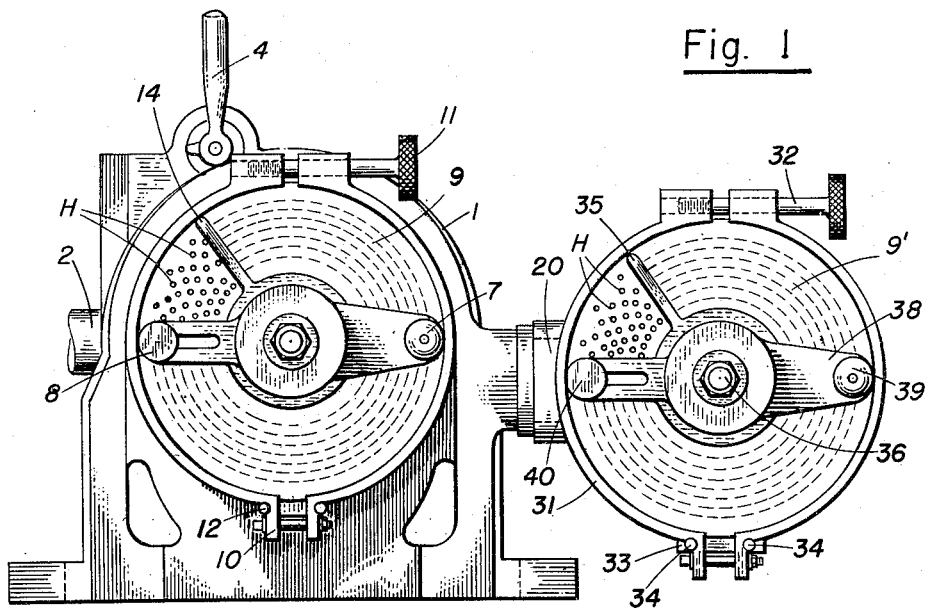
Figure 3:
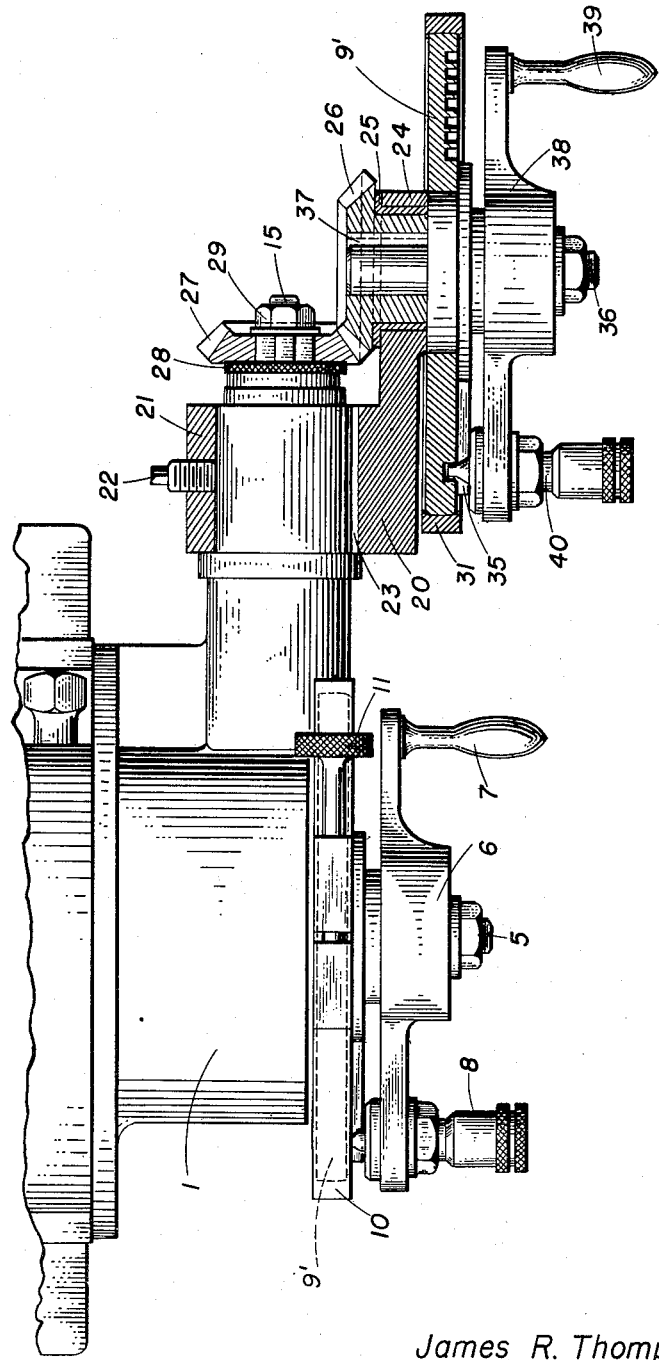

Other objects, purposes and advantages of the invention will hereafter more fully appear or be understood from the following description of a preferred embodiment of it illustrated in the accompanying drawings in which:

Fig. 1 is a front elevation of a typical standard indexing head with which the attachment is adapted for use, Fig. 2 is a corresponding view of the said head with the attachment in position thereon, and Fig. 3 is a top plan view partially in horizontal section illustrating the said attachment in greater detail and on a larger scale.

Referring now more particularly to the drawings the indexing head illustrated therein, which may be considered as typical of standard heads now in general use in the metal working arts, comprises a housing 1 provided with a main spindle 2 adapted to receive a work holding chuck, arbor, centering head or other appliance which may comprise a suitable dog or the like (not shown) for assuring rotation of the work in correspondence with that of the spindle, and a clamping lever 4 to actuate the usual mechanism for locking the spindle in indexed position while the work is being operated upon.

Within the housing 1 are disposed the conventional gears for rotating the main spindle 2 from a laterally outwardly projecting indexing spindle 5 carrying an indexing lever 6. In one arm of this lever is mounted an indexing handle 7 and in a slot in the other the usual spring-pressed indexing plunger 8 adapted for insertion selectively into any of a plurality of holes in an indexing plate 9 removably positioned in coaxial relation with the spindle 5 and adapted to be clamped in non-rotative relation to the housing 1 by a clamp 10 operated by a thumb screw 11 and in turn prevented from rotating relatively to the housing by pins 12 or other appropriate means. In Fig. 1 one sector arm 14 is shown adjacent the plunger arm of lever 6 and it will be understood the head includes an additional sector arm which does not appear in the drawing, these sector arms being useful as guides in positioning the indexing plunger when it is moved by the handle from one indexed position to the next. As the function and operation of the parts hitherto mentioned are well understood no further reference to them is required.

The standard dividing head such as illustrated in Fig. 1 affords a gear ratio of five to one between the indexing spindle 5 and the main spindle 2 whereby the former is rotated through five revolutions during each complete cycle to index the work through 360°. Consequently when plate 9 fixed in clamp 10 provides a row of holes H spaced to divide the circle it describes into, for example, 60 segments, by utilizing each such hole during a work cycle, that is for a single revolution of the work, the cycle may be divided into 300 work segments or positions, since the lever 6 in making five complete revolutions may be caused to make 5×60 or 300 stops, i. e. one at each hole, during each cycle. Correspondingly the number of positions available for any other row of holes on any of the several plates provided is five times the number of holes in the row being used and any indexing number a factor of the product of the gear ratio by the number of holes in the row may be obtained, since indexing may be effected by using every hole in the row, every second hole or by passing over any number of holes therein between successive positionings of the work. Thus in the example using a row of 60 holes when lever 6 rotates five revolutions to complete one revolution of the spindle, if the lever is stopped at every 10th hole 300÷10 or 30 indexing positions are obtained and the work, for example a gear, will then have 30 teeth cut on its periphery through the action of the cutter during the complete cycle. Furthermore, if the lever is stopped only at every 20th hole the teeth will be twice as widely spaced, considered angularly, and a total of but 15 teeth will be produced.

In addition to the mechanism thus far described standard dividing heads of the type with which my attachment is designed for use include a rear splined shaft 15 which is normally used for driving the work rotating main spindle continuously when required as, for example, in cutting a spiral groove in the work, any suitable power supply means being employed for driving the splined shaft at a constant rate corresponding to the angularity of the groove to be cut; the gear ratio of the usual train (not shown) transmitting motion from the splined shaft to the work spindle is ordinarily 40 to 1 whereby a complete revolution of the work requires 40 complete revolutions of the splined shaft.

In accordance with the invention and through the medium of my attachment the splined shaft 15 is utilized to assist in indexing the work for operations requiring the work be held stationary during the cutting of a groove, gear tooth or the like rather than for operations in which the work is rotated on its axis during the cutting, and to this end the attachment is adapted for securement to the main housing 1 adjacent the end of this shaft. The said attachment includes a bracket 20 comprising a collar 21 seating over the cylindrical portion of the housing which surrounds the splined shaft 15, said collar being provided with a set screw 22 for securing it to the housing, a key 23 disposed in appropriate key ways in the latter and in the collar opposite this set screw insuring and maintaining the proper location of the bracket when placing it in position.

A leg 24 of the bracket extends parallel to the splined shaft when the bracket is disposed on the housing and supports in a bushing 25 a bevel gear 26 meshing with a similar gear 27 of the same number of teeth, pitch and pitch diameter located on the end of the splined shaft to which it is removably secured by a washer 28 and nut 29.

Overlying the bracket leg 24 opposite the said gears an indexing plate 9' which may be any one of the standard plates supplied for the head is disposed within a clamp 31 adapted to be set up on the plate by operation of a thumb screw 32 and secured to a suitable bracket extension 33 by pins 34 corresponding to pins 12 or like means on the head, the usual sector arms 35 being disposed coaxially with and overlying the front face of the plate.

The gear 26 is provided with an axial spindle 36 secured to it by a key 37 and projecting through and beyond the plate and sector arms for the reception of an auxiliary indexing lever 38 similar to the lever 6 of the standard head and likewise provided with a handle 39 and a spring pressed indexing plunger 40 radially adjustable in a slot in the lever and, like the plunger 8, adapted to withdrawably engage any of the holes of index plate 9' when fixed in position by clamp 31.

When the plate 9' is held against rotation by its clamp 31 and clamp 10 backed off to free plate 9 operation of the indexing lever 38 indexes the work through the 40 to 1 ratio gear train in the housing 1 connecting the splined shaft 15 with the main spindle, and the number of indexing positions for each revolution of the work may therefore be any number equal to the quotient obtained by division of any smaller whole number into the product of 40 times the number of holes in a selected row on the plate.

With the standard series of six plates each having seven rows of holes with varying numbers of holes in their several rows from a minimum of 51 to a maximum of 100 there can thus be utilized with the aid of my invention, in addition to the index numbers available with the standard head, all numbers divisible by 2 from 100 to 200 and all numbers divisible by 8 from 400 to 500 or a total of 92 more numbers than can be obtained with the standard head using the same plates, including the index numbers 200 and 400 which cannot be obtained therewith.

It will be recognized that in the example given using a plate having a row of 60 holes in one series the standard head permits 300 indexing positions to be attained with said holes and likewise any smaller number equal to the quotient of the division of 300 by any whole number, whereas with the aid of my attachment using the same series of 60 holes any number of positions up to 2400 (60×40) equal to the quotient of the division of 2400 by a whole number may be obtained. More specifically, the standard indexing head cannot use the row of 60 holes in a plate for indexing 80 positions of the work, since the product number 300 is not evenly divisible by 80. The row of 60 holes may be utilized with the aid of my attachment to afford 80 indexing positions however, since the product number 2400 is evenly divisible by 80 and accurate indexing of 80 positions therefore can readily be accomplished by fixing the indexing plunger 40 in every 30th hole of the 60 hole row of plate 9' during the 40 revolutions of the handle requisite to effect a complete revolution of the main spindle and work.

It will be appreciated than in the example given the figure 60 for the number of holes in a selected row has been arbitrarily chosen and it is not intended to suggest that the series of plates provided with the standard head does not permit use of 80 indexing positions, since the standard plates usually include rows of 96 and 64 holes, either of which can be used with it to produce 80 index positions since 5×96=480 and 5×64=320 and both these products are evenly divisible by 80. The figure 60 is therefore merely a convenient one which affords a simple demonstration of the mathematical calculations requisite to determine the number of positions available with a row containing any given number of holes.

Continuing reference to it by way of example the row of 60 holes may be used with a standard head having a 5:1 gear ratio to index seventeen numbers from 2 to 300 inclusive, whereas with my attachment, employing the 40:1 ratio between the splined shaft and the main spindle, twenty-nine numbers from 2 to 300 inclusive are attainable and in addition six numbers from 400 to 2400 inclusive; similarly with a row of any other number of holes a greater variety of numbers may be indexed with the aid of my attachment than with the standard head alone.

Thus with a set of plates affording for use with the standard head all numbers in sequence from 2 to 100 and all numbers divisible by five up to 500 except the eleven multiples of 25 within the range of 175 to 475 inclusive, including 200 and 400 as above mentioned, the use of my attachment makes 200 and 400 available and ninety other numbers as well, it being of course understood that when indexing with plate 9 clamp 31 is backed off so as to free plate 9', if in position, and that when indexing with plate 9' clamp 10 is correspondingly backed off of plate 9.

The additional versatility so gained involves only the relatively minor cost of the attachment and does not require that plates be procured additional to those at hand in order to increase the indexing numbers available. The use of the 40:1 gear ratio between the indexing handle and the work in place of the standard 5:1 ratio is moreover sometimes an additional advantage in that it enables the work to be moved from one indexing position to another with less effort and it should therefore be noted that every number available with a given plate using the standard ratio is also available using my attachment as well as many additional ones.

Furthermore, the attachment may readily be removed from the head when the splined shaft 15 is to be rotated from a power drive, as when a spiral groove or the like is to be cut in the work, and no impairment of any of the normal capacities of the standard head results from the provision of my attachment or its use therewith.

While I have herein described my invention with considerable particularity and illustrated in the drawings an attachment embodying it in association with a particular indexing or dividing head to which I do not desire or intend to be limited or confined in any way, it will be understood the head may be of any appropriate specific character, such heads, having common essential characteristics but differing in minor details, being made by several manufacturers and generally available on the market; moreover changes and modifications in the details of construction of the attachment itself to adapt it for use with a given head or for other reasons may be made if desired without departing from the spirit and scope of the invention as defined in the appended claims.

Having thus described my invention, I claim and desire to protect by Letters Patent of the United States:

1. In combination with an indexing head comprising a housing, a main spindle, an indexing spindle and a shaft selectively operable to rotate the main spindle at different gear ratios, index plate supporting means, index plate clamping means operable to restrain from rotation an index plate supported by the supporting means and means for rotating the main spindle intermittently through a plurality of angularly equal intervals in correspondence to divisions of an indexing plate comprising a predetermined number and arrangement of indexing holes when said plate is supported by said supporting means and restrained from rotation, an attachment including a bracket removably securable to the housing adjacent the end of said shaft, an auxiliary indexing spindle journaled in the bracket, gearing interposed between the auxiliary indexing spindle and the shaft whereby to drive the shaft upon rotation of the auxiliary spindle when through release of the clamping means the index plate is free to rotate, index plate supporting means and means for rotating the auxiliary spindle intermittently through angularly equal intervals in correspondence to the divisions of an indexing plate similar to the first mentioned plate when supported by the last mentioned supporting means.

2. In combination with an indexing head including a housing, a main spindle, an indexing spindle, reduction gearing of predetermined ratio connecting said spindles, a shaft, other reduction gearing of greater predetermined ratio connecting the shaft with the main spindle, an indexing lever on the indexing spindle and index plate supporting and clamping means proximate thereto, auxiliary indexing means detachably positioned proximate the shaft and comprising other index plate supporting means, a second indexing lever, a stub shaft carrying said lever, and gearing connecting said stub shaft with the first mentioned shaft whereby when a given index plate is clamped against rotation in the said supporting and clamping means the main spindle can be indexed to a predetermined number of positions by operation of the first mentioned lever and when a similar plate is supported in the second supporting means and the clamping means for the first plate released the main spindle can be indexed to other positions unattainable by use of either plate in the first mentioned supporting and clamping means.

References Cited in the file of this patent

UNITED STATES PATENTS

| | | |
|---|---|---|
| 343,846 | Phillips | June 15, 1886 |
| 893,954 | Van Huffel | July 21, 1908 |
| 1,024,254 | Garrett | Apr. 23, 1912 |
| 1,461,316 | La Casse | July 10, 1923 |
| 1,477,374 | Marshall | Dec. 11, 1923 |
| 2,309,241 | Curtis | Jan. 26, 1943 |

FOREIGN PATENTS

| | | |
|---|---|---|
| 524,950 | Great Britain | Aug. 19, 1940 |